CONKLIN & NEWTON.
Grain-Drill.

No. 21,323.  Patented Aug. 31, 1858.

UNITED STATES PATENT OFFICE.

SMITH CONKLIN AND GEORGE NEWTON, OF STERLING, ILLINOIS.

IMPROVEMENT IN SEEDING-MACHINES.

Specification forming part of Letters Patent No. 21,323, dated August 31, 1858.

*To all whom it may concern:*

Be it known that we, SMITH CONKLIN and GEORGE NEWTON, of Sterling, in the county of Whiteside and State of Illinois, have invented a new and Improved Broadcast-Seeding Machine; and we do hereby declare that the following is a full, clear, and exact description of the same, reference being had to the annexed drawings, making a part of this specification, in which—

Figure 1:
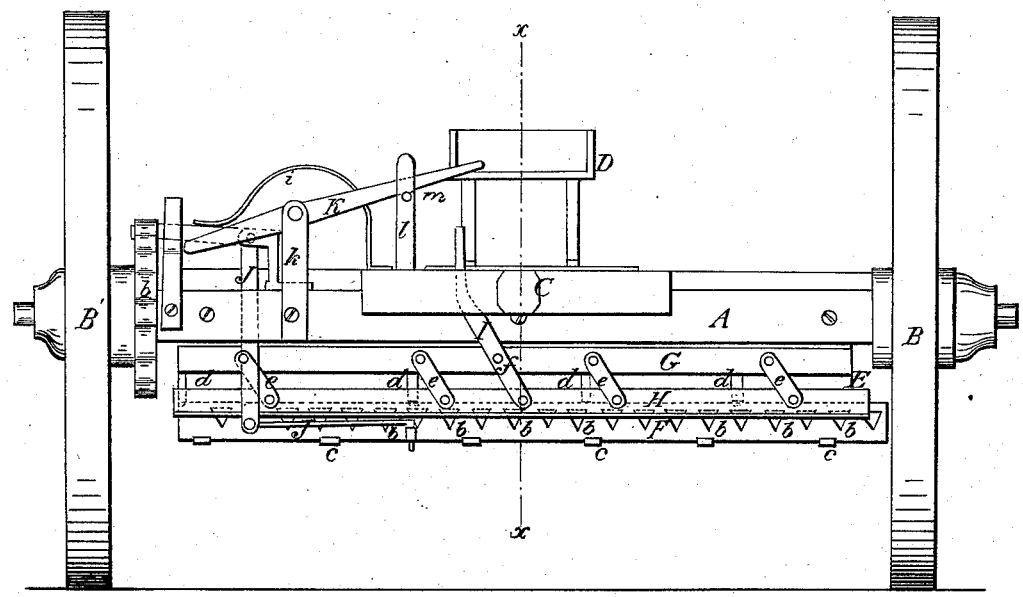
Figure 2:
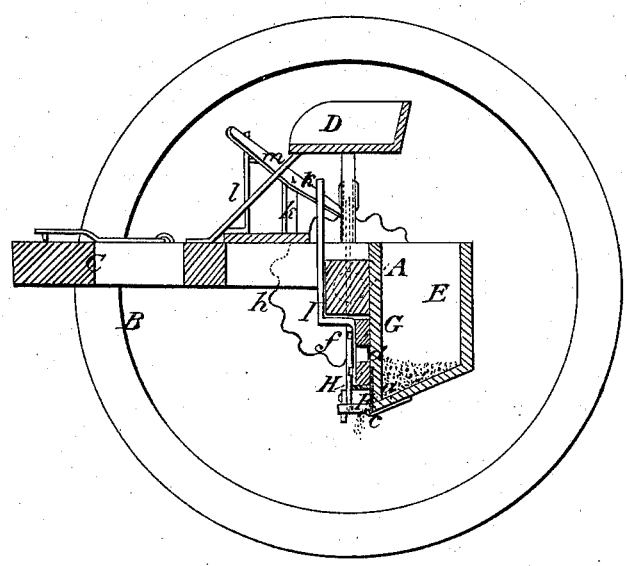

Figure 1 is front view of our improvement. Fig. 2 is a transverse vertical section of the same, taken in the line x x, Fig. 1.

Similar letters of reference indicate corresponding parts in the two figures.

This invention consists in the arrangement of a seed-distributing device, with the peculiar means employed for regulating the discharge of the seed therefrom.

To enable those skilled in the art to fully understand and construct our invention, we will proceed to describe it.

A represents an axle; B B', the wheels thereof, and C is a draft-pole attached to the axle A at its center.

D is a driver's seat, placed on the back part of the pole C.

E is a seed-box, which is attached to the back side of the axle A, and extends the whole length of said axle. This box may be divided into compartments by partitions. The seed-box extends some distance below the axle A, and an opening, a, is made in the lower part of its front side, said opening extending the whole length of the box.

Directly over the opening a a perforated metal plate, F, is placed, said plate having triangular openings b made through it, as shown clearly in Fig. 1. The plate F has its lower edge fitted in guides c, which are attached to the bottom of the seed-box, and the upper edge of the plate F is fitted in a rabbet in the front side of the box, and plates d project over the upper edge of the plate to retain it in proper position.

To the front side of the seed-box E, and just below the axle A, a bar, G, is permanently attached, and to the bar G a similar and parallel bar, H, is attached by a series of arms, e, which are parallel with each other, the arms being pivoted to the respective bars G H.

I is a lever, which is pivoted to the front side of the box E, as shown at f. The lower end of this lever is attached to the bar H, and the upper end of the lever extends upward by the side of the driver's seat D.

The bar H is placed over or in front of the perforated plate F, and by adjusting the lever I the perforations b may be more or less covered by the bar H, so as to regulate their size, as may be required, the variation in the size of the perforations being effected by a short movement of the bar H, owing to the triangular form of the openings; or the opening may be entirely covered or closed by the bar.

The perforated plate F has a reciprocating motion given it from the wheel B' by the following means: To the inner end of the hub g of said wheel a scalloped wheel or cam, h, is placed, and the end of the upper arm of a bent lever, J, rests on the periphery of said cam, and is kept upon it by a spring, i. The end of the lower arm of said lever is attached to the plate F by means of a connecting-rod, j. (See Fig. 1.)

K is a lever, which is attached to the upper end of an upright, k, said upright being secured to the axle. One end of this lever passes under the upper arm of lever J, and the other end projects to within a short distance of the driver's seat D and by the side of an upright, l, having a pin, m, projecting from it.

The seed-box E is filled with seed, and as the machine is drawn along a reciprocating motion is given the plate F by the cam h and lever J, and the seed is distributed on the ground in broadcast form by said plate, the seed passing through the perforations b in greater or less quantities, according to the size of said perforations, the size being regulated by adjusting the bar H. The plate F not only distributes the seed, but it agitates to a certain extent the seed in the seed-box and prevents it from choking or clogging therein.

The device is exceedingly simple, may be constructed at a reasonable cost, and there are no parts liable to get out of repair.

We do not claim broadly a perforated reciprocating slide without reference to the form or shape of the perforations and the gage or regulating-bar H, for such device is common to many classes of seeding-machines; but What we do claim as new, and desire to secure by Letters Patent, is—

The arrangement and combination of the plate F, guides c, bars G H, and box E, as and for the purposes herein shown and described.

SMITH CONKLIN.
GEORGE NEWTON.

Witnesses:
HENRY N. FEATHER,
G. F. BACHMAN.